United States Patent [19]

Toda et al.

[11] 4,351,192

[45] Sep. 28, 1982

[54] FLUID FLOW VELOCITY SENSOR USING A PIEZOELECTRIC ELEMENT

[75] Inventors: Minoru Toda; Susumu Osaka, both of Machida, Japan

[73] Assignee: RCA Corporation, New York, N.Y.

[21] Appl. No.: 215,000

[22] Filed: Dec. 10, 1980

[51] Int. Cl.³ .............................................. G01F 1/28
[52] U.S. Cl. ............................. 73/861.18; 73/861.74; 73/DIG. 4; 367/118
[58] Field of Search ........... 73/861.18, 861.71, 861.74, 73/861.75, DIG. 4, 517 R, 703, 861.76; 367/99, 114, 118

[56] References Cited

U.S. PATENT DOCUMENTS

| | | |
|---|---|---|
| 2,935,872 | 5/1960 | Misner . |
| 2,985,018 | 5/1961 | Williams ............................ 73/703 |
| 3,140,612 | 7/1964 | Houghton et al. ............. 73/DIG. 4 |
| 3,452,594 | 7/1969 | Dale . |
| 3,508,623 | 4/1970 | Greenstein ...................... 367/118 X |
| 3,857,277 | 12/1974 | Moore ............................... 73/861.74 |
| 3,955,415 | 5/1976 | Sharon .............................. 73/861.74 |

FOREIGN PATENT DOCUMENTS 1309702 3/1973 United Kingdom ............ 73/861.57

Primary Examiner—Charles A. Ruehl
Attorney, Agent, or Firm—Glenn H. Bruestle

[57] ABSTRACT

A piezoelectric, acoustic vibration detecting element is positioned in a fluid flow to be measured so as to be moved according to the intensity of the fluid flow away from a source of acoustic vibration. As the distance between the acoustic vibration source and the element increases with increasing fluid flow intensity, reducing the acoustic pressure on the element, the magnitude of an electrical output signal produced by the element decreases providing a detectable measurement of the change in the fluid flow intensity.

1 Claim, 2 Drawing Figures

FLUID FLOW VELOCITY SENSOR USING A PIEZOELECTRIC ELEMENT

This invention relates to a fluid flow velocity sensor and, particularly, to a fluid flow velocity sensor using a piezoelectric element.

Different forms of fluid flow velocity sensors are known. Most are orientated to the measurement of high fluid flow velocities and, therefore, are less sensitive to low fluid flow velocities, resulting in erroneous flow velocity measurements at the lower flow velocities. Other known sensors characteristically include a combination of movable elements which are subject to mechanical failure. Still other sensors are fragile. There is a need in the art for a fluid flow velocity sensor which is characterized by a simple mechanical structure, low material cost, compact construction, a minimum of movable parts, low power consumption, and the capability of measuring low fluid flow velocities with high sensitivity.

SUMMARY OF THE INVENTION

A piezoelectric element is positioned in close proximity to a source of acoustic vibration and is free to move in the path of a fluid flow to be measured. The element senses the acoustic vibration to provide an electrical output signal according to the acoustic pressure thereon from the vibration. As the fluid flow intensity changes, the element is correspondingly spaced from the source of vibration. The output signal varies with the resulting change in acoustic pressure on the element and provides a detectable measurement of the fluid flow intensity.

DETAILED DESCRIPTION

Various kinds of piezoelectric materials are known. Ceramic materials, for example, PZT, exhibit a piezoelectric effect. Polymer materials are now known also to exhibit a piezoelectric effect. While ceramics tend to be brittle and, if fabricated thin, easy to break, polymer materials, for example, a polyvinylidene fluoride (PVF$_2$) can be fabricated in flexible, thin films. It is also known that a piezoelectric element can be used to convert electrical signals into vibrations or vibrations into electrical signals.

Figure 1:
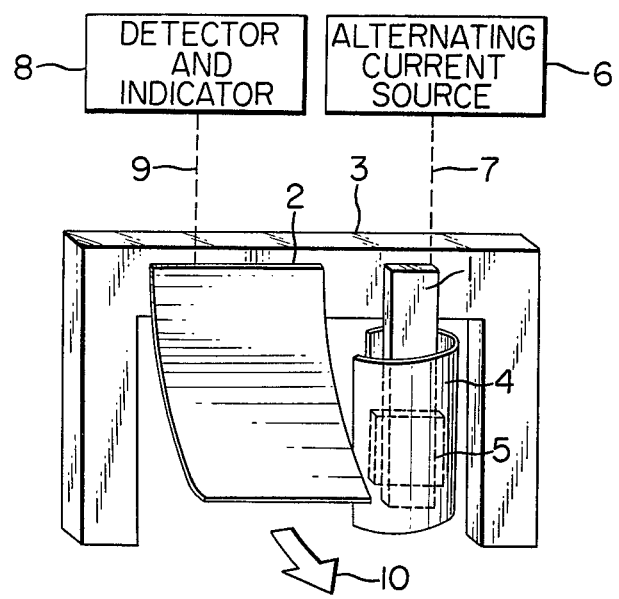
FIG. 1 shows one embodiment of the invention.

Referring to FIG. 1, a small piezoelectric element 1, for example, of a ceramic material, and a larger piezoelectric element 2, for example, of polyvinylidene fluoride (PVF$_2$) polymer films, are each suspended at one end from a supporting member 3. The two elements 1 and 2 are mounted in close proximity so that the element 2 senses acoustic vibration of the smaller element 1. While the elements are shown spaced apart a small distance in FIG. 1, the two elements 1 and 2 may overlap each other. The elements 1 and 2 are mounted on the member 3 in a known manner to permit their operation as described below. Member 3 is of a suitable material providing electrical and vibrational isolation between the two elements 1 and 2.

A source of alternating current 6 is connected by suitable contacts (not shown) on the element 1 and by conductors represented by the dashed line 7 to cause the element 1 to acoustically vibrate. The free end of the element 1 vibrates at a frequency determined by the frequency of the source 6. The element 1, preferably, may be operated at the mechanical resonant condition, where a small excitation signal produces a large vibration amplitude. The piezoelectric element 2 disposed close to the element 1 senses the acoustic vibration of the element 1 and, in turn, produces an electrical output signal of a magnitude determined by the spacing between the two elements 1 and 2. A suitable detector and indicator 8 is connected to element 2 by suitable contacts (not shown) on the element 2 and by conductors represented by the dashed line 9.

As the acoustic vibration from element 1 propagates through the field of interest such as air or gas, the resulting acoustic pressure on the element 2 changes according to the propagation distance between the two elements 1 and 2. When the acoustic pressure is at the maximum upon the two elements 1 and 2 being at the closest possible proximity, the maximum output signal is detected by the detector and indicator 8. As the free end of element 2 moves in the presence of a fluid flow represented by the arrow 10, the distance between elements 1 and 2 increases according to the intensity of the fluid flow. As the intensity of the fluid flow increases, the acoustic pressure on the element 1 decreases and the level of the output signal detected by the detector and indicator 8 decreases. The detector and indicator 8 is calibrated to provide a smooth variance as the element 2 moves from a zero angle through a large tilt angle in the presence of the fluid flow 10.

Elements 1 and 2 have been described as preferably being made of a piezoelectric ceramic material and piezoelectric polymer films, for example, PVF$_2$, respectively. The use of polymer films for the element 2 is advantageous, in this case due to the high sensitivity and light weight of such material. In the case polymer films are used for the element 1, it may be found desirable to provide a suitable guard 4 for the element 1. The guard 4 is disposed in such a way that an open space for the acoustic propagation from the element 1 is provided, as shown in FIG. 1. The guard 4 shields the element 1 from being influenced by the fluid flow 10, which could otherwise introduce an element of error in the measured fluid flow at the detector and indicator 8. Further, an acoustic radiator 5 may be attached to the element 1 as shown in FIG. 1 to provide for more efficient acoustic vibration emission. While elements 1 and 2 are described as being entirely made of piezoelectric material, each of elements 1 and 2 may be a combination of a non-piezoelectric material and a piezoelectric material for economy of construction and the requirements of a particular application.

Figure 2:
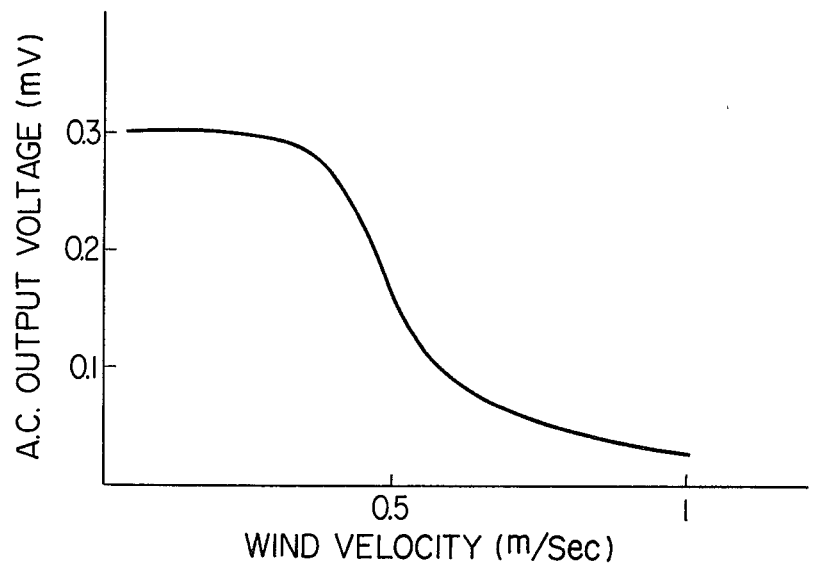
FIG. 2 is a curve showing test results of a wind velocity sensor constructed according to the present invention.

FIG. 2 is a curve showing the test results of a wind velocity sensor constructed according to the present invention. Element 1 was a ceramic bimorph of 0.3 cm. width, 2 cm. length, and 0.06 cm. thickness. Element 2 was a two sheet PVF$_2$ bimorph of 1.8 cm. width, 2 cm. length with each PVF$_2$ layer 9 $\mu$m. in thickness. An acoustic radiator 5 was an aluminum sheet of 1.4 cm. width, 1.3 cm. length, and 70 $\mu$m. thickness. An alternating current voltage of 20 volts at a frequency of 1,000 Hz. was applied to the element 1.

What is claimed is:

1. In combination, a first piezoelectric element driven from a source of alternating current to propagate an acoustic vibration of a frequency determined according to the frequency of said source, a second piezoelectric element sensitive to said acoustic vibration to produce an electrical output signal according to the acoustic pressure thereon from said vibration, means for mounting said elements in close proximity to one another with said second element mounted in a fluid flow to be measured and movable away from said first element according to the intensity of said fluid flow, said second element being arranged to produce said output signal with decreasing magnitude as the intensity of said fluid flow increases thereby increasing the spacing between said elements, and means for detecting said output signal and providing an indication of the magnitude of said output signal.

* * * * *